Patented July 19, 1927.

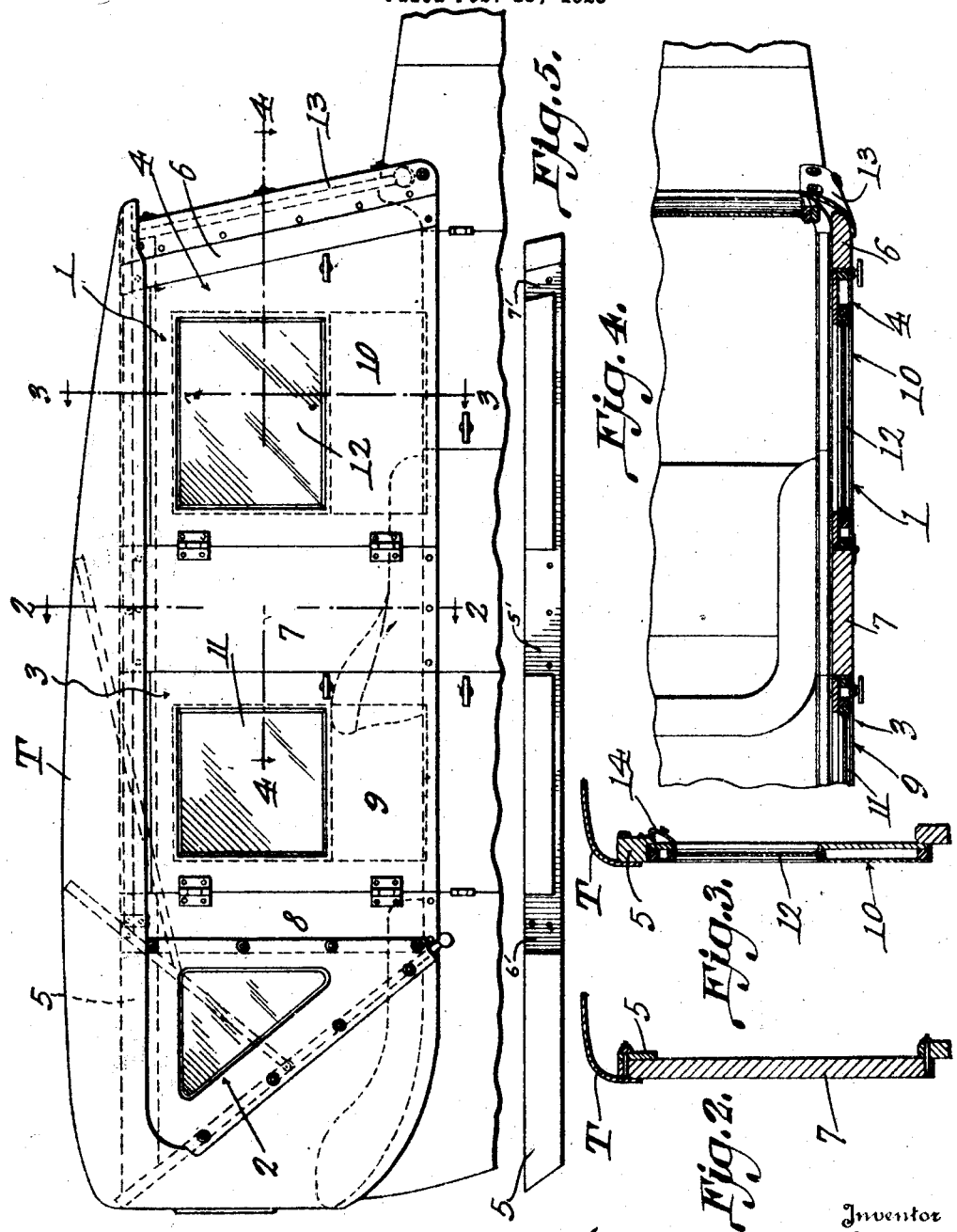

1,636,453

UNITED STATES PATENT OFFICE.

GEORGE M. BAILEY, OF GRACEMONT, OKLAHOMA.

ALL-WEATHER TOP FOR AUTOMOBILES.

Application filed February 19, 1925. Serial No. 10,338.

This invention relates to all weather tops for Ford cars.

The object of the invention is to provide an attachment for Ford car tops whereby an open car may be converted into a closed car for winter use and an open car for summer use.

Another object is to so construct such means that it may be applied to an ordinary Ford car top without making any changes therein.

Another object is to provide an attachment of this character equipped with hinged doors and glass windows which when in use may be readily opened and which converts the ordinary top of a Ford touring or runabout car into an air-tight closed-in all-weather car.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a portion of a Ford car body equipped with this improved attachment;

Fig. 2 is a transverse section taken on the line 2—2 of Fig. 1;

Fig. 3 is a similar view taken on the line 3—3 of Fig. 1; and

Fig. 4 is a horizontal section taken on the line 4—4 of Fig. 1.

Figure 5 is an elevational view of the upper supporting bar.

The attachment constituting this invention comprises side members 1 which are exactly alike except that they are made rights and lefts one for each side of the car and hence one only will be described in detail. Each side closure for the car top comprises a rear section 2 intermediate section 3 and front section 4 mounted in a suitable frame, the upper bar 5 of which is designed to be located under the side edge of the top T, as is shown clearly in Fig. 3. This upper bar 5 is provided with a cut out portion 5' disposed intermediate the ends of the bar, and cut out portions 6' and 7' on opposite sides of the cut out portion 5', the lower outer edge of the bar being cut away as at 12' so that the doors of the car may swing therein and be flush with the uprights to be hereinafter more fully described. A front upright 6 is bolted to the front end of the bar 5, the same being held within the cut out portion 7', and to the car body at the front thereof as is shown clearly in Fig. 1. Another upright 7 is also bolted at its upper end to the longitudinally extending side bar 1 and at its lower end to the car body between the front and rear doors of the car. Another upright 8 is secured at its upper end to the bar 1 and at its lower end to the car body at the rear of the back door of the car. This upright 8 forms a support for the rear hinged door 9 constituting a part of the attachment, and also for the triangular rear curtain section 2 which is snapped onto said member 8 and to the bow of the car as is shown clearly in Fig. 1.

The upright 7 which like uprights 8 and 6 is preferably composed of wood, forms the support for the front door 10 of the attachment which is hinged thereto and also is designed to be engaged by the lock carried on the rear door 9.

Both the rear door 9 and the front door 10 are equipped with glass windows 11 and 12 respectively which are mounted to slide up and down in said doors and are constructed so that no rattling will occur A curtain 13 snaps onto the front portion of the car as is usual with curtains of present construction and onto the upright 6 forming an air-tight closure between said upright and the windshield.

The uprights 6, 7 and 8 are not only bolted to the bar 1 but to the longitudinal side bar of the car top. These uprights are preferably made of wood while the doors 9 and 10 are constructed of tin or other suitable sheet-metal on the outside while the inside is covered with paper-board put together with screws and glue similar to the Ford car doors as now made. Each of the windows of the car doors is provided at its upper end with a suitable latch shown at 14 in Fig. 3 designed for securing the windows in closed position.

From the above description it will be obvious that this improved top attachment may be readily applied without in any way changing the top of the car except to drill a few holes in the longitudinal side bar or bow of the top and in the top of the car body, the snaps now found on the front upright by the windshield and rear of the car being used for connecting the curtain section 2 and the front section 13.

To adapt the attachment for use on a roadster the front door section and the front and rear curtains 13 and 2 respectively are the only parts used.

It will thus be seen that this convertible top attachment may be comparatively cheaply constructed and readily applied and it may be left in place during summer weather if desired or removed, the windows and the doors being opened will permit ventilation of the car and yet it will be protected during rains, storms and the like.

I claim:—

In a device of the character described, an upper bar adapted to be secured to a motor vehicle adjacent to the top thereof and within the confines of the sides of the top, said bar having a substantially wide central cut out portion and having cut out portions disposed on opposite sides of the central cut out portion, uprights having their upper ends secured within the cut out portions, said bar having a longitudinal cut out portion formed along the lower edge, closures having slidable windows and having pockets to receive the windows, means for hingedly connecting the closures to the uprights, said closures being constructed so that the upper edges thereof will move into the longitudinal cut out portion, the lower ends of the closures and uprights overlying the upper edge of the body of the car to which the device is secured.

In testimony that I claim the foregoing as my own, I have hereto affixed my signature.

GEORGE M. BAILEY.